United States Patent
Keller

(10) Patent No.: US 10,289,900 B2
(45) Date of Patent: May 14, 2019

(54) SYSTEM AND METHOD FOR BODY LANGUAGE ANALYSIS

(71) Applicant: Interactive Intelligence Group, Inc., Indianapolis, IN (US)

(72) Inventor: Jonathan M. Keller, Lafayette, IN (US)

( * ) Notice: Subject to any disclaimer, the term of this patent is extended or adjusted under 35 U.S.C. 154(b) by 0 days.

(21) Appl. No.: 15/267,732

(22) Filed: Sep. 16, 2016

(65) Prior Publication Data

US 2018/0082112 A1    Mar. 22, 2018

(51) Int. Cl.
| | | |
|---|---|---|
| G06F 9/00 | (2006.01) | |
| G06T 7/20 | (2017.01) | |
| G08B 21/18 | (2006.01) | |
| G09B 5/14 | (2006.01) | |
| G06K 9/00 | (2006.01) | |
| G09B 5/06 | (2006.01) | |

(52) U.S. Cl.
CPC ............ *G06K 9/00335* (2013.01); *G06T 7/20* (2013.01); *G08B 21/18* (2013.01); *G09B 5/065* (2013.01); *G09B 5/14* (2013.01)

(58) Field of Classification Search
CPC ............................................ G06K 2009/00395
See application file for complete search history.

(56) References Cited

U.S. PATENT DOCUMENTS

| | | | | |
|---|---|---|---|---|
| 7,457,404 B1* | 11/2008 | Hession | ............. | H04M 3/5175 379/265.07 |
| 8,054,964 B2 | 11/2011 | Flockhart et al. | | |
| 8,483,431 B2* | 7/2013 | Xu | ..................... | G06K 9/00711 382/103 |
| 8,654,937 B2* | 2/2014 | Agapi | ................. | H04M 3/5175 379/265.02 |
| 9,451,087 B2* | 9/2016 | Fagundes | .............. | H04M 3/523 |
| 9,549,068 B2* | 1/2017 | Krishnan | ............ | H04M 3/4936 |
| 2004/0249650 A1 | 12/2004 | Freedman et al. | | |
| 2008/0151038 A1* | 6/2008 | Khouri | ................... | H04N 7/147 348/14.01 |
| 2008/0189171 A1* | 8/2008 | Wasserblat | ........... | G06Q 10/063 705/7.32 |

(Continued)

FOREIGN PATENT DOCUMENTS

KR     1020100014092 A     2/2010

OTHER PUBLICATIONS

Bobick, Aaron F. et al., The Recognition of Human Movement Using Temporal Templates, in IEEE Transactions on Pattern Analysis an Machine Intelligence, pp. 257-267, vol. 23, Issue 3, Mar. 2001. See p. 257, right column, lines 26-37, p. 261, right column, lines 48-52.

(Continued)

*Primary Examiner* — Bobbak Safaipour

(57) ABSTRACT

A system and method are presented for body language analysis of a video interaction. In a contact center system, the video interaction between an agent and a customer may be monitored and used to determine automatic actions when threshold are met and/or matches are made. Training videos comprising determined metrics may be used for comparison to real-time interactions. Scoring and/or matches may be utilized to determine a threshold to trigger pre-determined actions based on comparison to the training videos.

34 Claims, 3 Drawing Sheets

(56) References Cited

U.S. PATENT DOCUMENTS

| | | | |
|---|---|---|---|
| 2009/0124863 A1* | 5/2009 | Liu | A61B 5/1114 600/300 |
| 2010/0136957 A1* | 6/2010 | Horodezky | G06F 3/017 455/414.2 |
| 2012/0296642 A1* | 11/2012 | Shammass | G10L 25/63 704/211 |
| 2013/0002866 A1 | 1/2013 | Hampapur et al. | |
| 2013/0300900 A1* | 11/2013 | Pfister | G06K 9/00315 348/239 |
| 2014/0025620 A1* | 1/2014 | Greenzeiger | G06F 17/30702 706/47 |
| 2014/0032471 A1* | 1/2014 | Reddy | G10L 15/22 706/47 |
| 2014/0257820 A1* | 9/2014 | Laperdon | G10L 25/63 704/270 |
| 2014/0310271 A1* | 10/2014 | Song | G06K 9/00288 707/732 |
| 2014/0314225 A1* | 10/2014 | Riahi | G06Q 30/02 379/265.09 |
| 2015/0154394 A1* | 6/2015 | Kapinos | G06F 21/36 726/19 |
| 2015/0172465 A1 | 6/2015 | Neystadt et al. | |
| 2015/0186311 A1* | 7/2015 | Yap | G06F 13/32 710/308 |
| 2015/0193718 A1* | 7/2015 | Shaburov | G06Q 10/06395 705/7.39 |
| 2015/0286628 A1* | 10/2015 | Akamine | G06F 17/271 704/9 |
| 2015/0379619 A1* | 12/2015 | Verde | G06Q 30/0641 705/27.1 |
| 2016/0078279 A1* | 3/2016 | Pitre | A61B 5/7264 382/118 |
| 2016/0109954 A1* | 4/2016 | Harris | G06F 3/017 345/156 |
| 2016/0364009 A1* | 12/2016 | Lemberger | H04N 21/4424 |
| 2017/0055895 A1* | 3/2017 | Des Jardins | A61B 5/165 |
| 2017/0091763 A1* | 3/2017 | Beadle | G07C 9/00007 |
| 2017/0109584 A1* | 4/2017 | Yao | G06K 9/00718 |
| 2017/0178005 A1* | 6/2017 | Kumar | G06N 5/022 |
| 2017/0186444 A1* | 6/2017 | Lu | G10L 25/63 |

OTHER PUBLICATIONS

International Search Report and Written Opinion for Application No. PCT/US2017/051892, dated Apr. 17, 2018, 14 pages.

* cited by examiner

SYSTEM AND METHOD FOR BODY LANGUAGE ANALYSIS

BACKGROUND

The present invention generally relates to telecommunications systems and methods, as well as streaming video connections. More particularly, the present invention pertains to the analysis of body language in the streaming video connections.

SUMMARY

A system and method are presented for body language analysis of a video interaction. In a contact center system, the video interaction between an agent and a customer may be monitored and used to determine automatic actions when threshold are met and/or matches are made. Training videos comprising determined metrics may be used for comparison to real-time interactions. Scoring and/or matches may be utilized to determine a threshold to trigger pre-determined actions based on comparison to the training videos.

In one embodiment, a method is presented for analyzing gestures of one or more parties to a video interaction in a contact center system, wherein the contact center system comprises at least a video stream analyzer, and performing actions based on the gestures, the method comprising the steps of: receiving the video interaction in the contact center system from a first user to a second user, wherein the video interaction occurs through a video stream; determining metrics, for the first user, for a previous time interval of the on-going video stream by the video stream analyzer; referencing stored metrics of system training videos, by the video stream analyzer, and comparing the stored metrics with the determined metrics of step (b); and determining if a match is made, wherein if a match is made, pre-classifying the video interaction and performing an action, wherein if a match is not made, repeating the process from step (b).

In another embodiment, a method is presented for analyzing gestures of one or more parties to a video interaction in a contact center system, wherein the contact center system comprises at least a video stream analyzer, and performing actions based on the gestures, the method comprising the steps of: receiving the video interaction in the contact center system from a first user to a second user, wherein the video interaction occurs through a video stream; determining metrics, for at least one of the first user and the second user, for a previous time interval of the on-going video stream by the video stream analyzer; referencing stored metrics of system training videos, by the video stream analyzer, and comparing the stored metrics with the determined metrics of step (b); and determining if a threshold is met, wherein if a threshold is met, performing an action, wherein if a threshold is not met, repeating the process from step (b).

In another embodiment, a method is presented for analyzing gestures of one or more parties to a video interaction in a contact center system, wherein the contact center system comprises at least a video stream analyzer, and performing actions based on the gestures, the method comprising the steps of: receiving the video interaction in the contact center system from a first user to a second user, wherein the video interaction occurs through a video stream; determining metrics, for at least one of the first user and the second user, for a previous time interval of the video stream by the video stream analyzer; referencing stored metrics of system training videos, by the video stream analyzer, and comparing the stored metrics with the determined metrics of step (b); and determining if one or more conditions are met, wherein if the one or more conditions are met, pre-classifying the video interaction and performing an action, wherein if the one or more conditions are not met, repeating the process from step (b).

DETAILED DESCRIPTION

Figure 1:
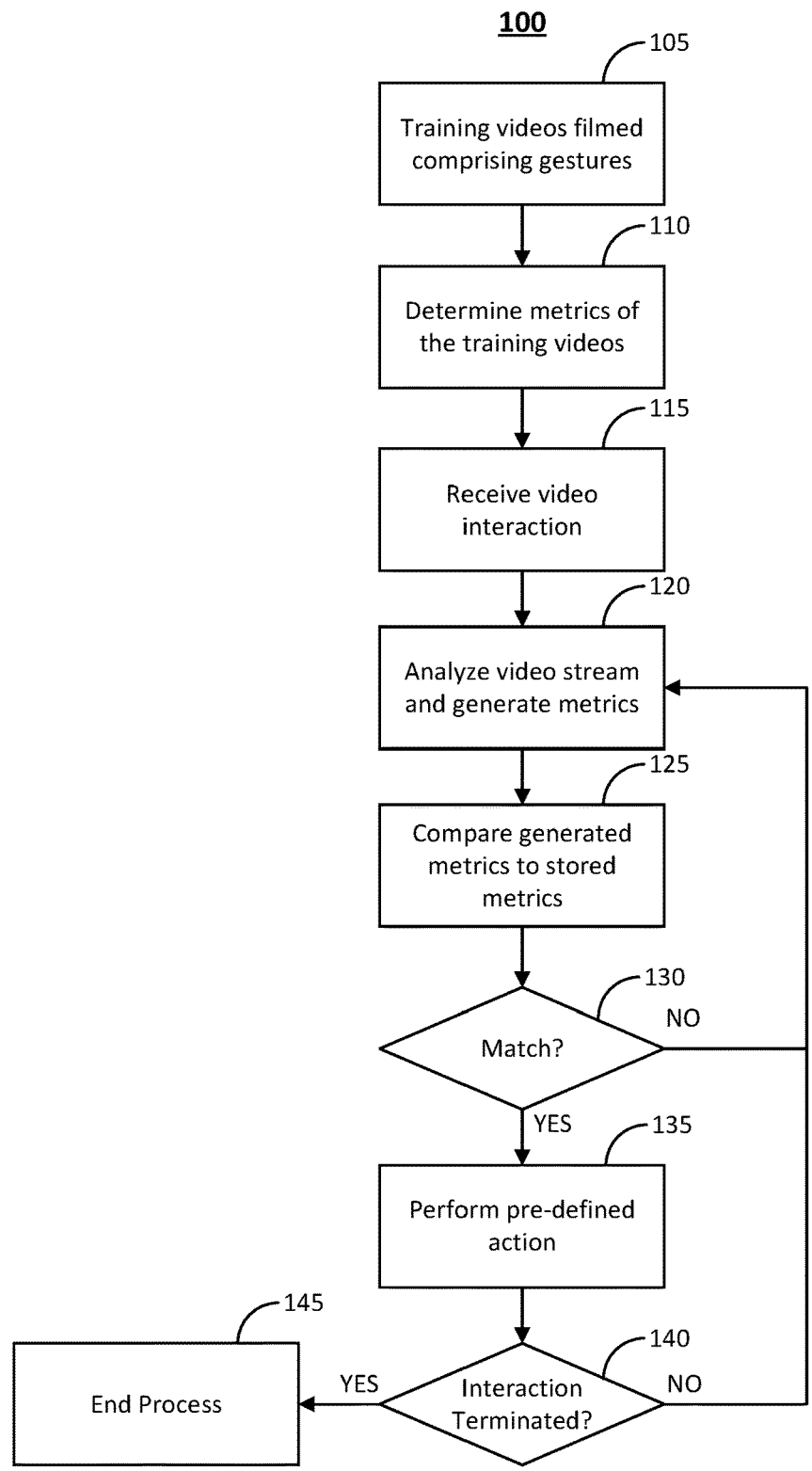
FIG. 1 is a flowchart illustrating an embodiment of a process for analyzing body language.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The use of gesture detection in videos is widespread. In general, training videos are filmed in which an actor performs various motions. From these motions, a "Motion Energy Image" (MEI) is created. An MEI comprises a still picture which has a color for every pixel that moved in the video and black for every pixel which did not. A "Motion History Image" (MHI) is also created. The MHI is similar to an MEI except that older motion has faded to gray. Specific image moment invariants, well-known as "Hu moment invariants", may be used to make the stored representation of the movement/gesture become invariant to scale and translation (Hu, M. K. Hu, "Visual Pattern Recognition by Moment Invariants", IRE Trans. Info. Theory, vol IT-8, pp. 179-187, 1962). The representation can be recognized regardless of the distance of a person to the camera or their positioning. For real-time applicability to a video interaction, such as in a contact center system, this becomes CPU-intensive and inefficient.

In a contact center system utilizing video chat for interactions with customer service representatives, an external chat UI may be in place which talks via real-time to a unified collaboration system. An example of a unified collaboration system may comprise Interactive Intelligence Group Inc.'s PureCloud suite of products or any other product suite which at least supports video conferencing or video chat capabilities. The customer service representative, or agent, works within the unified collaboration system and interacts with customers. The video stream between the customer and the agent is analyzed by a video stream analyzer which is resident on the contact center system side of the stream. In an embodiment, the video stream analyzer may also be resident on the customer side. Body language analysis of an interaction between the agent and the customer may be used to determine automatic actions when thresholds are met and/or matches are made as described in greater detail below.

FIG. 1 is a flowchart illustrating an embodiment of a process for analyzing body language, indicated generally at

100. The process 100 may be resident on the video stream analyzer of the contact center system as previously described.

In operation 105, training videos are filmed comprising gestures. For example, the training videos serve as models for the video stream analyzer to compare real-time interactions with. In an embodiment, training videos comprise gestures which are associated with different emotions that might be typical of a customer interacting with a customer service representative. The gestures in the training videos might indicate anger, happiness, and a wide variety of emotions. For example, a customer giving the middle finger to the camera might indicate anger and unhappiness with the agent and/or the situation. In another example, a customer might be pounding the table with their fist while yelling. The gestures are pre-defined by the user of the unified collaboration system and may vary across different organizations. In an embodiment, the gestures may also vary within an organization based on factors such as geographic region, product line, etc.

Gestures may also be used in conjunction with speech amplitude and keyword spotting. For example, a customer yelling swear words while flipping off the agent might receive a stronger metric than just yelling, swearing, or flipping off the agent alone. The system training videos may also comprise gestures indicating emotion and a plurality of levels of the emotion associated with the gestures. For example, some gestures might have higher levels of emotion associated with them. A customer pounding the table may not be exhibiting as much emotion as if they are throwing an object. Control is passed to operation 110 and the process 100 continues.

In operation 110, the MEI and MHI metrics of the training videos are determined. For example, the MEI and the MHI of the training videos are determined and stored in a database for reference by the video stream analyzer. The MEI and MHI metrics may be determined by methods commonly known in the art. In an embodiment, the metrics may be labelled with numeric scores and/or text labels to indicate levels of emotions associated with gestures. Gestures might be assigned point values that are based on the severity of a gesture. For example, a lewd gesture (e.g., the middle finger) might receive a stronger score than a gesture such as a dismissive hand wave. Conversely, a wave might also be scored in such a matter to offset the score of a negative gesture. Other rules might automatically alert a supervisor and escalate the interaction if a specific gesture is detected. Control is passed to operation 115 and the process 100 continues.

In operation 115, a video interaction is received in the contact center system. The customer may be wanting to speak with a customer service representative about an issue they are having with a product or service, for example. Interactions may be placed via the appropriate media, for example, video conferencing or video chat, using devices which are capable of supporting the appropriate media. The devices might comprise a computer, a tablet, a smartphone, or another device capable of video streaming. Control is passed to operation 120 and the process 100 continues.

In operation 120, the video stream is analyzed and metrics are created for the interaction. For example, when the agent receives the communication through the contact center system, the video stream analyzer may begin analyzing the interaction of the customer with the agent in real-time. Every fraction of a second (or a pre-determined time interval) during the video interaction, MEI and MHI metrics are created for that specific time frame interval of the video interaction for one or more of the parties to the interaction. For example, depending upon the system, the customer or the agent may be monitored by the video stream analyzer and metrics created for the monitored party. In another embodiment, both the customer and the agent may be monitored and metrics created for both parties. Metrics may be determined on a cumulative basis with the score updated as each new metric is determined. Metrics may also be averaged across a time interval or they may be examined interval by interval. Control is passed to operation 125 and the process 100 continues.

In operation 125, the generated metrics are compared to the stored metrics. For example, the stored metrics from the training videos may be compared to the generated metrics for the on-going video interaction by the video stream analyzer. Control is passed to operation 130 and the process 100 continues.

In operation 130, it is determined whether there is a match between the metrics. If it is determined that there is a match, control is passed to operation 135 and the operation 100 continues. If it is determined there is not a match, control is passed back to operation 120 and the process 100 continues.

The determination in operation 130 may be based on any suitable criteria. For example, the comparison examines actions by the customer in the previous interval of time and compares these with the metrics for matches. For example, does the customer gesture match training gesture "punch-right-fist-into-left-palm?", to name a non-limiting example.

In operation 135, a pre-defined action is performed if a match is detected. For example, if the customer gesture matches any of the training videos that are pre-classified as "very angry", the interaction may be automatically escalated and a supervisor alerted. Pre-classification might comprise recording specified gestures for training from a sample.

Actions may be pre-defined by a system user. In another embodiment, an action comprises changing the script that the agent is working from to address the situation. For example, the script might include logic which hides text the agent was reading from and displays new text. In another example, where an interaction may not already be recorded, the match might trigger recording of the interaction. Conversely, if the interaction is being recorded, the recording may be terminated. For example, if a customer decides to expose themselves inappropriately to the agent, the recording may be terminated to avoid liability, such as possession the recording, especially if a customer is known to be a minor. In another example, the agent's performance evaluation might be positively or negatively influenced. In another embodiment, an action might comprise automatically terminating the interaction. In another embodiment, an automatic email to the customer may be generated. In yet another embodiment, authoritative figures such as internal security may be notified if an illegal activity is occurring or a legitimate threat seems to occur.

In an embodiment where the agent actions are analyzed, the agent evaluation may be impacted and/or their skill set, or designation, within the contact center changed. For example, an agent may be marked as "angry" for a time interval to prevent interactions from being routed to them during a cool-off period. This designation may then be removed after the time interval has lapsed. Conversely, agents with happy customers, or alternatively, happy agents, might receive more interactions. Control is passed to operation 140 and the process 100 continues.

In operation 140, it is determined whether or not the interaction has ended. If it is determined that the interaction has ended, control is passed to operation 145 and the process ends. If it is determined that the interaction has not ended, control is passed back to operation 120 and the process 100 continues.

The determination in operation 140 may be based on any suitable criteria. For example, the action taken in operation 135 might effectively terminate the interaction and no further monitoring is necessary. Action may be taken that does not result in termination of the interaction, such as the triggering of recording the interaction. As such, continued monitoring of the interaction may still be required.

Figure 2:
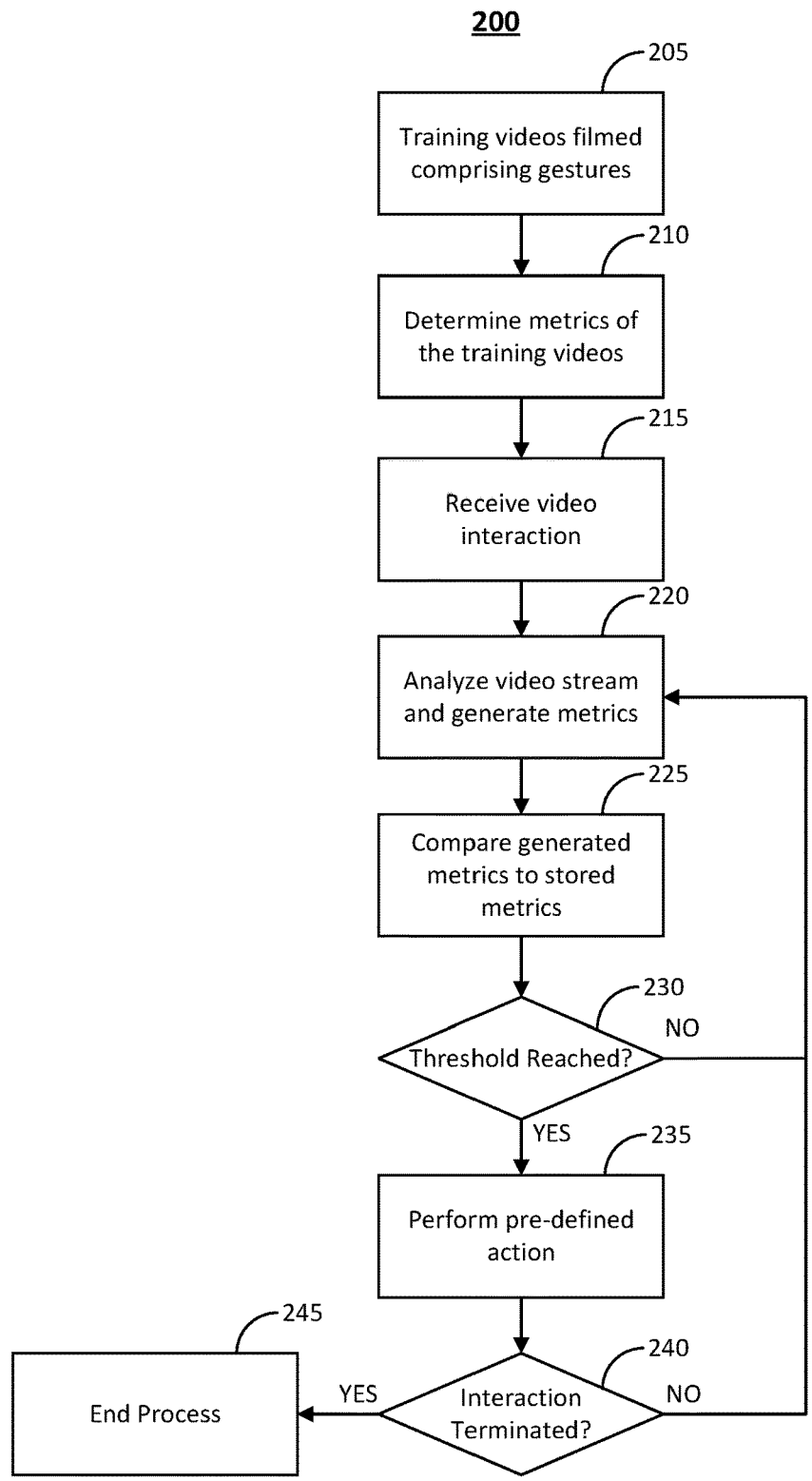
FIG. 2 is a flowchart illustrating another embodiment of a process for analyzing body language.

Other embodiments of analyzing body language may also be used in a contact center system. FIG. 2 is a flowchart illustrating another embodiment of a process for analyzing body language. The process 200 may be resident on the video stream analyzer of the contact center system.

In operation 205, training videos are filmed comprising gestures. For example, the training videos serve as models for the video stream analyzer to compare real-time interactions with. In an embodiment, training videos comprise gestures which are associated with different emotions that might be typical of a customer interacting with a customer service representative. The gestures in the training videos might indicate anger, happiness, and a wide variety of emotions. For example, a customer giving the middle finger to the camera might indicate anger and unhappiness with the agent and/or the situation. In another example, a customer might be pounding the table with their fist while yelling. The gestures are pre-defined by the user of the unified collaboration system and may vary across different organizations. In an embodiment, the gestures may also vary within an organization based on factors such as geographic region, product line, etc.

Gestures may also be used in conjunction with speech amplitude and keyword spotting. For example, a customer yelling swear words while flipping off the agent might receive a stronger metric than just yelling, swearing, or flipping off the agent alone. The system training videos may also comprise gestures indicating emotion and a plurality of levels of the emotion associated with the gestures. For example, some gestures might have higher levels of emotion associated with them. A customer pounding the table may not be exhibiting as much emotion as if they are throwing an object. Control is passed to operation 210 and the process 200 continues.

In operation 210, the MEI and MHI metrics of the training videos are determined. For example, the MEI and the MHI of the training videos are determined and stored in a database for reference by the video stream analyzer. The MEI and MHI metrics may be determined by methods commonly known in the art. In an embodiment, the metrics may be labelled with numeric scores and/or text labels to indicate levels of emotions associated with gestures. Gestures might be assigned point values that are based on the severity of a gesture. For example, a lewd gesture (e.g., the middle finger) might receive a stronger score than a gesture such as a dismissive hand wave. Conversely, a wave might also be scored in such a matter to offset the score of a negative gesture. Other rules might automatically alert a supervisor and escalate the interaction if a specific gesture is detected. Control is passed to operation 215 and the process 200 continues.

In operation 215, a video interaction is received in the contact center system. The customer may be wanting to speak with a customer service representative about an issue they are having with a product or service, for example. Interactions may be placed by the customer via the appropriate media, for example, video conferencing or video chat, using devices which are capable of supporting the appropriate media. The devices might comprise a computer, a tablet, a smartphone, or another device capable of video streaming. Control is passed to operation 220 and the process 200 continues.

In operation 220, the video stream is analyzed and metrics are created for the interaction. For example, when the agent receives the communication through the contact center system, the video stream analyzer may begin analyzing the interaction of the customer with the agent in real-time. Every fraction of a second (or a pre-determined time interval) during the video interaction, MEI and MHI metrics are created for that specific time frame interval of the video interaction for one or more of the parties to the interaction. For example, depending upon the system, the customer or the agent may be monitored by the video stream analyzer and metrics created for the monitored party. In another embodiment, both the customer and the agent may be monitored and metrics created for both parties. Metrics may be determined on a cumulative basis with the interaction score updated as each new metric is determined. Metrics may also be averaged across a time interval or they may be examined interval by interval. Control is passed to operation 225 and the process 200 continues.

In operation 225, the generated metrics are compared to the stored metrics. For example, the stored metrics from the training videos may be compared to the generated metrics for the on-going video interaction by the video stream analyzer. Control is passed to operation 230 and the process 200 continues.

In operation 230, it is determined whether a threshold has been reached. If it is determined that a threshold has been reached, control is passed to operation 235 and the process 200 continues. If it is determined that threshold has not been reached, control is passed back to operation 220 and the process continues.

The determination in operation 230 may be based on any suitable criteria. For example, a threshold may be determined by cumulative points from analysis of the video stream, where negative gestures are scored as the interaction is occurring. Gestures occurring individually may not be enough to trigger an action, but over the course of the interaction, the sum of the gestures may reach a threshold which triggers an action. In another embodiment, a threshold may also be determined with positive gestures cancelling out negative gestures throughout the interaction. In another embodiment, a grace period may be employed, where the duration of a gesture is taken into account when scoring an interaction. For example, the longer the gesture occurs, the more the score may increments, such as a momentary middle finger vs a medium duration middle finger vs a long duration middle finger.

In operation 235, a pre-defined action is performed once the threshold has been reached. For example, if the cumulative score of the interaction between the agent and customer reaches a pre-determined threshold, one or more actions may be triggered.

Actions may be pre-defined by a system user. In an embodiment, an action comprises changing the script that the agent is working from to address the situation. For example, the script might include logic which hides text the agent was reading from and displays new text. In another example, where an interaction may not already be recorded, the threshold might trigger recording of the interaction. Conversely, if the interaction is being recorded, the recording may be terminated. For example, if a customer decides to expose themselves inappropriately to the agent, the recording may be terminated to avoid liability, such as possession the recording, especially if a customer is known to be a minor. In another example, the agent's performance evaluation might be positively or negatively influenced. In another embodiment, an action might comprise automatically terminating the interaction. In another embodiment, an automatic email to the customer may be generated. In yet another embodiment, authoritative figures such as internal security may be notified if an illegal activity is occurring or a legitimate threat seems to occur.

In an embodiment where the agent actions are analyzed, the agent evaluation may be impacted and/or their skill set, or designation, within the contact center changed. For example, an agent may be marked as "angry" for a time interval to prevent interactions from being routed to them during a cool-off period. This designation may then be removed after the time interval has lapsed. Conversely, agents with happy customers, or happy agents, might receive more interactions. Control is passed to operation 240 and the process 200 continues.

In operation 240, it is determined whether or not the interaction has ended. If it is determined that the interaction has ended, control is passed to operation 245 and the process ends. If it is determined that the interaction has not ended, control is passed back to operation 220 and the process 200 continues.

The determination in operation 240 may be based on any suitable criteria. For example, the action taken in operation 235 might effectively terminate the interaction and no further monitoring is necessary. Action may be taken that does not result in termination of the interaction, such as the triggering of recording the interaction. As such, continued monitoring of the interaction may still be required.

Figure 3:
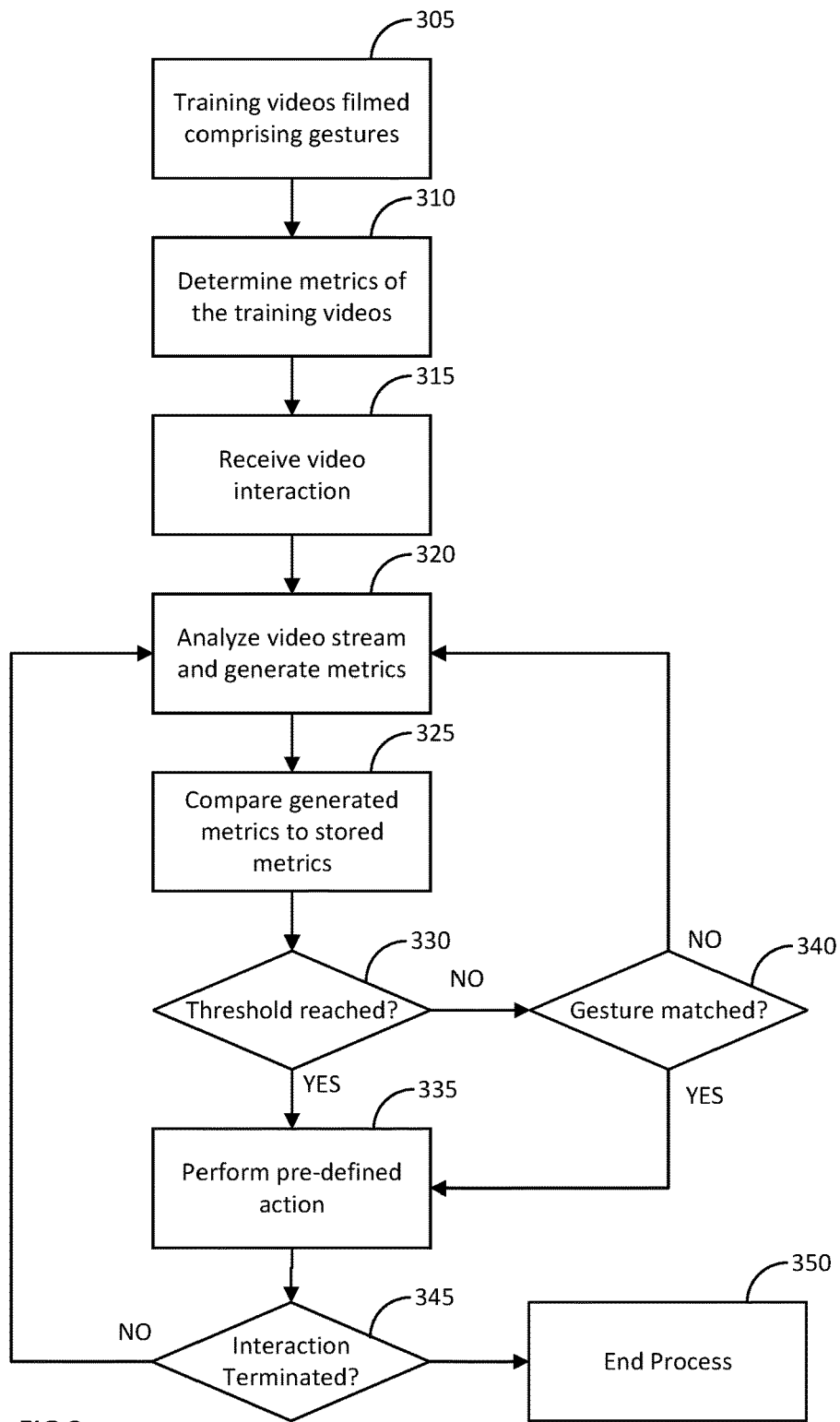
FIG. 3 is a flowchart illustrating another embodiment of a process for analyzing body language.

Other embodiments of analyzing body language may also be used in a contact center system. FIG. 3 is a flowchart illustrating another embodiment of a process for analyzing body language. The process 300 may be resident on the video stream analyzer of the contact center system In operation 305, training videos are filmed comprising gestures. For example, the training videos serve as models for the video stream analyzer to compare real-time interactions with. In an embodiment, training videos comprise gestures which are associated with different emotions that might be typical of a customer interacting with a customer service representative. The gestures in the training videos might indicate anger, happiness, and a wide variety of emotions. For example, a customer giving the middle finger to the camera might indicate anger and unhappiness with the agent and/or the situation. In another example, a customer might be pounding the table with their fist while yelling. The gestures are pre-defined by the user of the unified collaboration system and may vary across different organizations. In an embodiment, the gestures may also vary within an organization based on factors such as geographic region, product line, etc.

Gestures may also be used in conjunction with speech amplitude and keyword spotting. For example, a customer yelling swear words while flipping off the agent might receive a stronger metric than just yelling, swearing, or flipping off the agent alone. The system training videos may also comprise gestures indicating emotion and a plurality of levels of the emotion associated with the gestures. For example, some gestures might have higher levels of emotion associated with them. A customer pounding the table may not be exhibiting as much emotion as if they are throwing an object. Control is passed to operation 310 and the process 300 continues.

In operation 310, the MEI and MHI metrics of the training videos are determined. For example, the MEI and the MHI of the training videos are determined and stored in a database for reference by the video stream analyzer. The MEI and MHI metrics may be determined by methods commonly known in the art. In an embodiment, the metrics may be labelled with numeric scores and/or text labels to indicate levels of emotions associated with gestures. Gestures might be assigned point values that are based on the severity of a gesture. For example, a lewd gesture (e.g., the middle finger) might receive a stronger score than a gesture such as a dismissive hand wave. Conversely, a wave might also be scored in such a matter to offset the score of a negative gesture. Other rules might automatically alert a supervisor and escalate the interaction if a specific gesture is detected. Control is passed to operation 315 and the process 300 continues.

In operation 315, a video interaction is received in the contact center system. The customer may be wanting to speak with a customer service representative about an issue they are having with a product or service, for example. Interactions may be placed via the appropriate media, for example, video conferencing or video chat, using devices which are capable of supporting the appropriate media. The devices might comprise a computer, a tablet, a smartphone, or another device capable of video streaming. Control is passed to operation 320 and the process 300 continues.

In operation 320, the video stream is analyzed and metrics are created for the interaction. For example, when the agent receives the communication through the contact center system, the video stream analyzer may begin analyzing the interaction of the customer with the agent in real-time. Every fraction of a second (or a pre-determined time interval) during the video interaction, MEI and MHI metrics are created for that specific time frame interval of the video interaction for one or more of the parties to the interaction. For example, depending upon the system, the customer or the agent may be monitored by the video stream analyzer and metrics created for the monitored party. In another embodiment, both the customer and the agent may be monitored and metrics created for both parties. Metrics may be determined on a cumulative basis with the interaction score updated as each new metric is determined. Metrics may also be averaged across a time interval or they may be examined interval by interval. Control is passed to operation 325 and the process 300 continues.

In operation 325, the generated metrics are compared to the stored metrics. For example, the stored metrics from the training videos may be compared to the generated metrics for the on-going video interaction by the video stream analyzer. Control is passed to operation 330 and the process 300 continues.

In operation 330, it is determined whether a threshold has been reached. If it is determined that a threshold has been reached, control is passed to operation 335 and the process 300 continues. If it is determined that threshold has not been reached, control is passed to operation 340 and the process continues.

The determination in operation 330 may be based on any suitable criteria. For example, a threshold may be determined by cumulative points from analysis of the video stream, where negative gestures are scored as the interaction is occurring. Gestures occurring individually may not be enough to trigger an action, but over the course of the interaction, the sum of the gestures may reach a threshold which triggers an action. In another embodiment, a threshold may also be determined with positive gestures cancelling out negative gestures throughout the interaction. In another embodiment, a grace period may be employed, where the duration of a gesture is taken into account when scoring an interaction. For example, the longer the gesture occurs, the more the score may increments, such as a momentary middle finger vs a medium duration middle finger vs a long duration middle finger.

In operation 340, it is determined whether there is a match between the metrics. If it is determined that there is a match, control is passed to operation 335 and the operation 300 continues. If it is determined there is not a match, control is passed back to operation 320 and the process 300 continues.

The determination in operation 340 may be based on any suitable criteria. For example, the comparison examines actions by the customer in the previous interval of time and compares these with the metrics for matches. For example, does the customer gesture match training gesture "punch-right-fist-into-left-palm?", to name a non-limiting example.

In operation 335, a pre-defined action is performed if the threshold or a match has been reached. For example, if the cumulative score of the interaction between the agent and customer reaches a pre-determined threshold, one or more actions may be triggered. In another example, if the customer gesture matches any of the training videos that are pre-classified as "very angry", the interaction may be automatically escalated and a supervisor alerted.

Actions may be pre-defined by a system user. In another embodiment, an action comprises changing the script that the agent is working from to address the situation. For example, the script might include logic which hides text the agent was reading from and displays new text. In another example, where an interaction may not already be recorded, the threshold or match might trigger recording of the interaction. Conversely, if the interaction is being recorded, the recording may be terminated. For example, if a customer decides to expose themselves inappropriately to the agent, the recording may be terminated to avoid liability, such as possession the recording, especially if a customer is known to be a minor. In another example, the agent's performance evaluation might be positively or negatively influenced. In another embodiment, an action might comprise automatically terminating the interaction. In another embodiment, an automatic email to the customer may be generated. In yet another embodiment, authoritative figures such as internal security may be notified if an illegal activity is occurring or a legitimate threat seems to occur.

In an embodiment where the agent actions are analyzed, the agent evaluation may be impacted and/or their skill set, or designation, within the contact center changed. For example, an agent may be marked as "angry" for a time interval to prevent interactions from being routed to them during a cool-off period. This designation may then be removed after the time interval has lapsed. Conversely, agents with happy customers, or alternatively, happy agents, might receive more interactions. Control is passed to operation 345 and the process 300 continues.

In operation 345, it is determined whether or not the interaction has ended. If it is determined that the interaction has ended, control is passed to operation 350 and the process ends. If it is determined that the interaction has not ended, control is passed back to operation 320 and the process 300 continues.

The determination in operation 345 may be based on any suitable criteria. For example, the action taken in operation 335 might effectively terminate the interaction and no further monitoring is necessary. Action may be taken that does not result in termination of the interaction, such as the triggering of recording the interaction. As such, continued monitoring of the interaction may still be required.

With regards to the process 300, it should be noted that the determination of whether a threshold has been achieved or whether a gesture has matched does not need to occur in any particular order. The order illustrated in FIG. 3 is for illustrative purposes and is only indicative of one embodiment of the process. It is within the scope of the embodiments described herein for the determination of whether a threshold has been achieved and whether a gesture match has occurred to be performed concurrently as well as in no particular order.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for analyzing gestures of one or more parties to a video interaction in a contact center system, wherein the contact center system comprises at least a video stream analyzer, and performing actions based on the gestures, the method comprising the steps of:
   a. receiving the video interaction in the contact center system from a first user to a second user, wherein the video interaction occurs through a video stream comprising a plurality of video frames comprising a plurality of pixels;
   b. determining metrics, for the first user, for a previous time interval of the on-going video stream by the video stream analyzer, the determining the metrics comprising:
      identifying pixels that moved in the video frames of the video stream; and
      computing at least one of a motion energy image metric or a motion history image metric based on the identified pixels;
   c. referencing stored metrics of system training videos, by the video stream analyzer, and comparing the stored metrics with the determined metrics of step (b) of the on-going video stream; and
   d. determining if a match is made between the determined metrics and the stored metrics from the comparing of step (c), wherein if the match is made, pre-classifying the video interaction and performing an action, wherein if the match is not made, repeating the process from step (b);
   wherein steps (b)-(d) cyclically occur continuously in real-time throughout a duration of the video interaction.

2. The method of claim 1, wherein the video interaction comprises a video chat.

3. The method of claim 1, wherein the system training videos comprise gestures indicating emotion and a plurality of levels of said emotion based on gestures.

4. The method of claim 1, wherein the system training videos comprise gestures used in relation to at least one of: speech amplitude and keyword spotting.

5. The method of claim 1, wherein the determining the metrics comprises determining the metrics on a cumulative basis with each passing time interval.

6. The method of claim 1, wherein the pre-classifying comprises assigning a match to the video interaction and the action performed is based on the pre-classifying.

7. The method of claim 1, wherein the action comprises at least one of: alerting a supervisor, alerting an authoritative figure, altering script used by the second user, recording the video interaction, generating an email to the first user, impacting the second user's performance evaluation, terminating the video interaction, placing the video interaction on hold, altering the second user's utilization score, and altering a number of interactions routed to the second user for a time interval.

8. The method of claim 1, wherein the first user comprises a customer.

9. The method of claim 1, wherein the second user comprises a customer service representative.

10. The method of claim 1, wherein the previous time interval of the on-going video stream is a fraction of a second in length, and wherein the motion energy image metric or the motion history image metric is determined at least once during each such time interval.

11. A method for analyzing gestures of one or more parties to a video interaction in a contact center system, wherein the contact center system comprises at least a video stream analyzer, and performing actions based on the gestures, the method comprising the steps of:
   a. receiving the video interaction in the contact center system from a first user to a second user, wherein the video interaction occurs through a video stream comprising a plurality of video frames comprising a plurality of pixels;
   b. determining metrics, for at least one of the first user and the second user, for a previous time interval of the on-going video stream by the video stream analyzer, the determining the metrics comprising:
      identifying pixels that moved in the video frames of the video stream; and;
      computing at least one of a motion energy image metric or a motion history image metric based on the identified pixels;
   c. referencing stored metrics of system training videos, by the video stream analyzer, and comparing the stored metrics with the determined metrics of step (b) of the on-going video stream;
   d. updating a cumulative score in response to determining a match from the comparing the stored metrics with the determined metrics of step (c); and
   e. determining if a threshold is met by the cumulative score, wherein if the threshold is met, performing an action, wherein if the threshold is not met, repeating the process from step (b), wherein
   steps (b)-(d) cyclically occur continuously in real-time throughout the duration of the video interaction.

12. The method of claim 11, wherein the threshold is determined by cumulative points from negative gestures.

13. The method of claim 11, wherein the threshold is determined by cumulative points from negative gestures and positive gestures, wherein points from positive gestures negate points from negative gestures.

14. The method of claim 11, wherein the video interaction comprises a video chat.

15. The method of claim 11, wherein the system training videos comprise gestures indicating emotion and a plurality of levels of said emotion based on gestures.

16. The method of claim 11, wherein the system training videos comprise gestures used in relation to at least one of: speech amplitude and keyword spotting.

17. The method of claim 11, wherein the determining the metrics comprises determining the metrics on a cumulative basis with each passing time interval.

18. The method of claim 11, wherein the action comprises at least one of: alerting a supervisor, alerting an authoritative figure, altering script used by the second user, recording the video interaction, generating an email to the first user, impacting the second user's performance evaluation, terminating the video interaction, placing the video interaction on hold, altering the second user's utilization score, and altering a number of interactions routed to the second user for a time interval.

19. The method of claim 11, wherein the first user comprises a customer.

20. The method of claim 11, wherein the second user comprises a customer service representative.

21. The method of claim 11, wherein the previous time interval of the on-going video stream is a fraction of a second in length, and wherein the motion energy image metric or the motion history image metric is determined at least once during each such time interval.

22. A method for analyzing gestures of one or more parties to a video interaction in a contact center system, wherein the contact center system comprises at least a video stream analyzer, and performing actions based on the gestures, the method comprising the steps of:
   a. receiving the video interaction in the contact center system from a first user to a second user, wherein the video interaction occurs through a video stream comprising a plurality of video frames comprising a plurality of pixels;
   b. determining metrics, for at least one of the first user and the second user, for a previous time interval of the video stream by the video stream analyzer, the determining the metrics comprising:
      identifying pixels that moved in the video frames of the video stream; and
      computing at least one of a motion energy metric or a motion history metric based on the identified pixels;
   c. referencing stored metrics of system training videos, by the video stream analyzer, and comparing the stored metrics with the determined metrics of step (b) of the on-going video stream; and
   d. determining if one or more conditions are met from the comparing of step (c), wherein if the one or more conditions are met, pre-classifying the video interaction and performing an action, wherein if the one or more conditions are not met, repeating the process from step (b), wherein
   steps (b)-(d) cyclically occur continuously in real-time throughout the duration of the video interaction.

23. The method of claim 22, wherein the conditions comprise a match and a threshold.

24. The method of claim 23, wherein the threshold is determined by cumulative points from negative gestures.

25. The method of claim 23, wherein the threshold is determined by cumulative points from negative gestures and positive gestures, wherein points from positive gestures negate points from negative gestures.

26. The method of claim 22, wherein the video interaction comprises a video chat.

27. The method of claim 22, wherein the system training videos comprise gestures indicating emotion and a plurality of levels of said emotion based on gestures.

28. The method of claim 22, wherein the system training videos comprise gestures used in relation to at least one of: speech amplitude and keyword spotting.

29. The method of claim 22, wherein the determining the metrics comprises determining the metrics on a cumulative basis with each passing time interval.

30. The method of claim 22, wherein the pre-classifying comprises assigning a match to the video interaction and the action performed is based on the pre-classifying.

31. The method of claim 22, wherein the action comprises at least one of: alerting a supervisor, alerting an authoritative figure, altering script used by the second user, recording the video interaction, generating an email to the first user, impacting the second user's performance evaluation, terminating the video interaction, placing the video interaction on hold, altering the second user's utilization score, and altering a number of interactions routed to the second user for a time interval.

32. The method of claim 22, wherein the first user comprises a customer.

33. The method of claim 22, wherein the second user comprises a customer service representative.

34. The method of claim 22, wherein the previous time interval of the on-going video stream is a fraction of a second in length, and wherein the motion energy image metric or the motion history image metric is determined at least once during each such time interval.

* * * * *